(12) United States Patent
Breiman

(10) Patent No.: US 7,124,055 B2
(45) Date of Patent: Oct. 17, 2006

(54) TIME SERIES ANALYSIS AND FORECASTING PROGRAM

(75) Inventor: Leo Breiman, Berkeley, CA (US)

(73) Assignee: Group 1 Software, Inc., Lanham, MD (US)

( * ) Notice: Subject to any disclaimer, the term of this patent is extended or adjusted under 35 U.S.C. 154(b) by 0 days.

(21) Appl. No.: 10/853,499

(22) Filed: May 26, 2004

(65) Prior Publication Data

US 2004/0220771 A1 Nov. 4, 2004

Related U.S. Application Data

(63) Continuation of application No. 09/965,056, filed on Sep. 25, 2001, now Pat. No. 6,745,150.

(60) Provisional application No. 60/235,261, filed on Sep. 25, 2000.

(51) Int. Cl.
*G06F 19/00* (2006.01)
(52) U.S. Cl. .......................... 702/181; 705/10
(58) Field of Classification Search ................ 702/179, 702/181–185, 187, 117–118; 703/2; 705/10, 705/5

See application file for complete search history.

(56) References Cited

U.S. PATENT DOCUMENTS

| | | | |
|---|---|---|---|
| 5,544,281 A | 8/1996 | Maruoka et al. | |
| 6,032,125 A | 2/2000 | Ando | |
| 6,125,105 A | 9/2000 | Edwards et al. | |
| 6,370,437 B1 | 4/2002 | Carter et al. | |
| 6,381,554 B1 | 4/2002 | Matsuo et al. | |
| 6,532,449 B1 | 3/2003 | Goertzel et al. | |
| 6,745,150 B1 * | 6/2004 | Breiman | 702/181 |

OTHER PUBLICATIONS

Box, G., et al., "Time Series Analysis: Forecasting and Control", Third Edition, 1994, Chapter 1, pp 2-6 and 39-40; Chapter 3, pp 46-88; Chapter 4, pp 89-130; Chapter 5, pp. 131-150; and Chapter 9, pp 327-361 and pp 367-369.

Makridakis, S., et al., "The Forecasting Accuracy of Major Time Series Methods", 1984 John Wiley & Sons, pp 167-200.

* cited by examiner

*Primary Examiner*—Edward Raymond
(74) *Attorney, Agent, or Firm*—Charles R. Malandra, Jr.; Angelo N. Chaclas

(57) ABSTRACT

A method and apparatus for performing forecasting using time series data are described. In one embodiment, the method includes designating a last portion of the time series data as a base pattern, searching the remaining portion of the time series data for candidate patterns using the base pattern, and identifying candidate forecasts corresponding to the candidate patterns. The method further includes calculating a set of final forecast values based on the candidate forecasts.

16 Claims, 6 Drawing Sheets

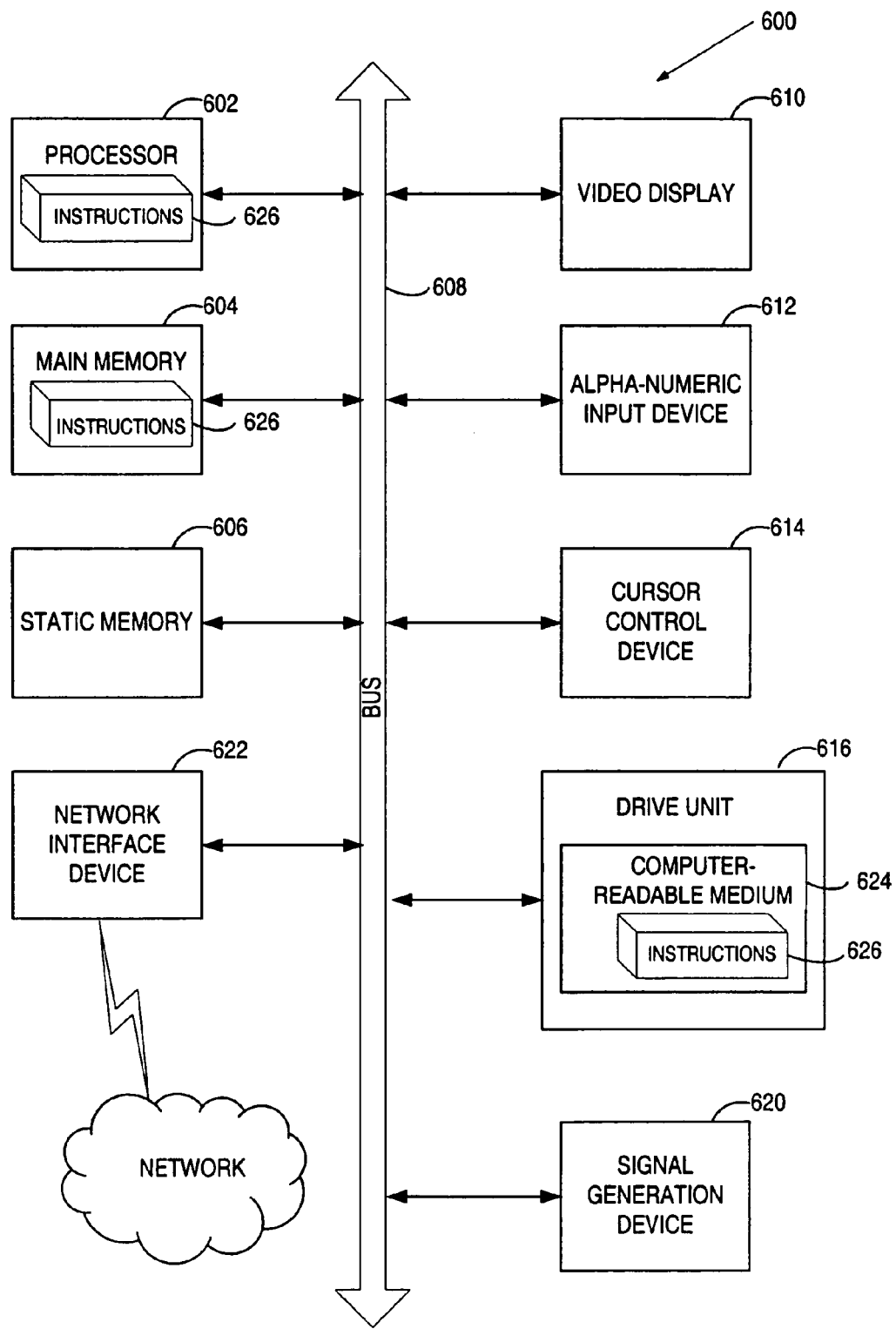

TIME SERIES ANALYSIS AND FORECASTING PROGRAM

RELATED APPLICATION

This application is a continuation of U.S. application Ser. No. 09/965,056, filed Sep. 25, 2001, now allowed U.S. Pat. No. 6,745,150, which claims the benefit of U.S. Provisional Application No. 60/235,261, filed Sep. 25, 2000.

FIELD OF THE INVENTION

The present invention relates to the field of time series analysis; more particularly, the present invention relates to performing forecasting based on time series data.

BACKGROUND

A time series is a sequence of observations that are ordered in time (e.g., observations made at evenly spaced time intervals). Some examples of time series data may include end-of-month stock prices for General Electric, hits per day at a web site, weekly sales of Windows 2000, electrical demand per hour in Seattle, daily high tide readings in San Francisco Bay, etc.

A time series may be stationary or non-stationary. A stationary time series has no long-term trend over the period it has been observed. One example of a stationary time series is the electrocardiogram readings of a person at rest. The series may seem noisy and jagged, but the long-term averages stay approximately the same. Another example is the yearly average of daily high tide readings in San Francisco Bay. Although high tide readings may vary from one day to another, their yearly averages stay approximately the same.

A non-stationary time series is characterized by a trend. For instance, the yearly average of the S&P 500 over the postwar years has distinct trends. Similarly, electrical demand in Seattle has a long-term trend as the demand is increasing in response to a growing population. Most economic time series—sales, web site hits, stock prices—have trends. The trend curve is not necessarily linear. It can go up for a while and then go down.

Various forecasting methods exist that attempt to predict future values of the time series based on the past time series data. Some forecasting methods are as simple as continuing the trend curve smoothly by a straight line. Other forecasting methods are more sophisticated. The most well known and widely used method is the ARIMA procedure (auto-regression and moving averages) due to Box and Jenkins (George E. P. Box, et al., "Time Series Analysis: Forecasting And Control," $3^{rd}$ Edition, Prentice Hall, Feb. 9, 1994). This procedure assumes that each measurement in a time series is generated by a linear combination of past measurements plus noise. Despite its popularity, the ARIMA method has proved to be inaccurate when used for non-stationary time series data (Spyros Markridaki, et al., "The Forecasting Accuracy of Major Time Series Methods," John Wiley And Sons 1984). Other existing forecasting methods also failed to provide accurate predictions for such commercial data as sales, web site hits, stock prices, etc.

Thus, an improved forecasting technique is needed that will have the ability to calculate future values of non-stationary time series with a sufficient degree of accuracy.

SUMMARY

A method and apparatus for performing forecasting using time series data are described. In one embodiment, the method includes designating a last portion of the time series data as a base pattern, searching the remaining portion of the time series data for candidate patterns using the base pattern, and identifying candidate forecasts corresponding to the candidate patterns in the time series data. The method further includes calculating a set of final forecast values based on the candidate forecasts.

BRIEF DESCRIPTION OF THE DRAWINGS

The accompanying drawings are included to provide a further understanding of the invention. These drawings are incorporated in and constitute a part of this specification. The drawings illustrate embodiments of the invention and, together with the description, serve to explain the principles of the invention. In the drawings:

FIG. 6 is a block diagram of an exemplary computer system.

DETAILED DESCRIPTION OF THE PRESENT INVENTION

Figure 1:
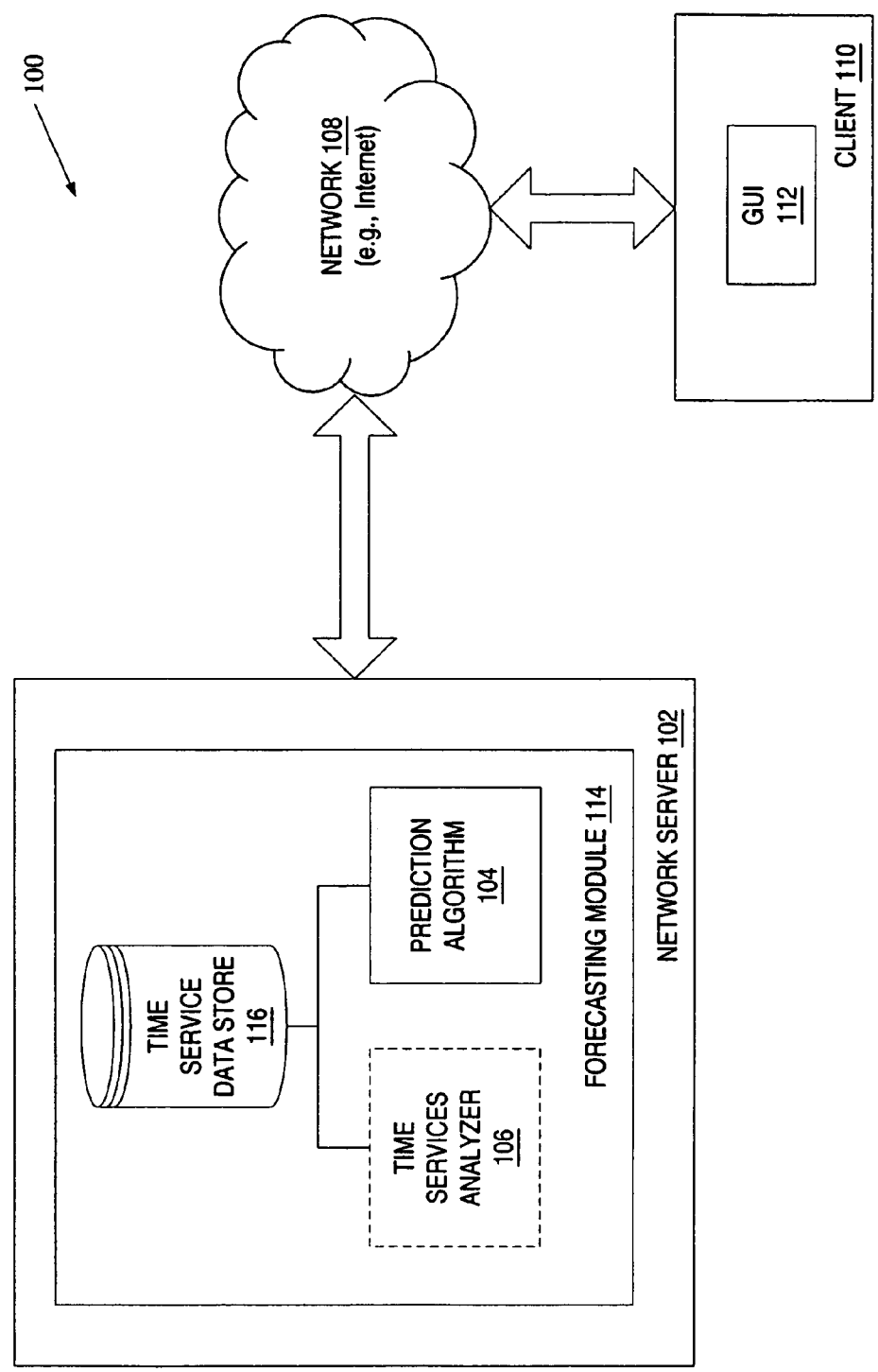
FIG. 1 is a block diagram of one embodiment of a system in which a forecasting technique can be used.

A method and apparatus for performing forecasting based on time series data are described. In the following description, numerous details are set forth to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMS, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

A technique of forecasting that uses existing time series data is described. The existing time series data may pertain to a variety of economic and commercial data such as observations of company's sales made at specific time intervals, hits per a specific time interval at a web site, observations of a company's stock price made at specific time intervals, electrical demand per a specific time interval in a particular area, etc.

In one embodiment, a last portion of the existing time series data is designated as a base pattern. In one embodiment, the length of the base pattern is defined by the number of time intervals for which the forecast is requested. Alternatively, the length of the base pattern may exceed the requested number of time intervals and may be either programmatically defined or specified by a user. The base pattern is used to search the portion of the existing time series data that precedes the base pattern for candidate patterns. In one embodiment, each pattern of the same length as the base pattern is designated as a candidate pattern. In one embodiment, each candidate pattern is assigned a weight based on the similarity between this candidate pattern and the base pattern. In one embodiment, only the candidate pattern with the highest weight is selected for future processing. In another embodiment, only the candidate patterns with the weight higher than a threshold value are selected for future processing. In yet another embodiment, all candidate patterns participate in subsequent processing.

Further, a portion of the time series data that immediately follows a corresponding candidate pattern is designated as a candidate forecast. The length of the candidate forecast is equal to the number of time intervals for which the forecast has been requested. The candidate forecasts are then used to calculate a set of final forecast values. In one embodiment, each candidate forecast is associated with a weight assigned to a corresponding candidate pattern, and the set of final forecast values is determined by calculating the weighted average of the candidate forecasts. Alternatively, the candidate forecast with the highest weight is used as a final forecast.

Once the set of final forecast values is calculated, the forecast is constructed. In one embodiment, an assessment of the forecast's accuracy is made by estimating an upper and lower confidence bands for the forecast. Confidence bands are estimated by constructing a forecast for the past time series values for which the trend curve is known and then comparing the constructed forecast with the known trend curve to compute the forecast errors.

In one embodiment, prior to forecasting, the existing time series is analyzed and modified. In one embodiment, the modification includes removing seasonality and noise from the time series prior to forecasting to simplify the forecasting process and to increase the accuracy of a resulting forecast. In one embodiment, once the set of final forecast values is calculated, an adjustment is made to include the seasonal effect into the resulting forecast.

A Forecasting System

FIG. 1 is a block diagram of one embodiment of a system 100 in which a forecasting technique can be used. Referring to FIG. 1, system 100 includes a network server 102 and a client 110 coupled to network server 102 via a network 108. Network 108 may be a public network (e.g., Internet) or a private network (e.g., Local Area Network (LAN), Intranet, Ethernet, etc.). Network server 102 communicates with multiple client devices including client 110.

In one embodiment, client 110 sends a request to perform forecasting to network server 102. The request of client 110 may include various information pertaining to desired forecasting. For example, the request may specify the location of the time series data that may be used for forecasting. The time series data may be stored in a file or a database residing on network server 116, and the request issued by client 110 may specify the path to this file or the name of a database table and its columns that store the time series data. Alternatively, the time series data may be stored in a file or a database residing on a different network device, and the request of client 110 may specify the address of the network device and information identifying the location of the time series data in this device. The request issued by client 110 may also specify the number of time intervals (e.g., six months, two weeks, four years, etc.) for which the forecast is requested, and various other information. In one embodiment, a graphical user interface (GUI) 112 is provided to facilitate input of the above information and to display the final forecast when it is constructed.

Network server 102 includes a forecasting module 114 to perform forecasting in response to the request of client 110. In one embodiment, forecasting module 114 includes a time series data store 116 and a prediction algorithm 104. Time series data store 116 stores the time series data that is used for forecasting. The time series data may pertain to a variety of economic and commercial data such as observations of a company's sales made at specific time intervals, hits per a specific time interval at a web site, observations of company's stock price made at specific time intervals, electrical demand per a specific time interval in a particular area, etc.

Prediction algorithm 104 constructs a requested forecast using the time series data stored in data store 116. In one embodiment, prediction algorithm 104 designates a last portion of the time series data as a base pattern and then searches the remaining portion of the time series data for candidate patterns using the base pattern, as will be described in more detail below. Further, prediction algorithm 104 identifies candidate forecasts corresponding to the candidate patterns and calculates a set of final forecast values using the candidate forecasts, as will be explained in greater detail below. In one embodiment, prediction algorithm 104 is also responsible for assessing the forecast's accuracy. The assessment is made by estimating upper and lower confidence bands for the forecast.

In one embodiment, forecasting module 114 also includes a time series analyzer 106. Time series analyzer 106 performs analysis of the time series stored in data store 116 to estimate a seasonal component and a noise component of the time series. Time series analyzer 106 then removes these components from the time series data prior to forecasting. The resulting time series data is stored in data store 116 for use by prediction algorithm 104.

It should be noted that although FIG. 1 illustrates a network-based operation of forecasting module 114, the use of network communication is not necessary for the operation of forecasting module 114. That is, forecasting module 114 can be a local program executing on client 110, with GUI 112 being a part of this local program.

Figure 2:
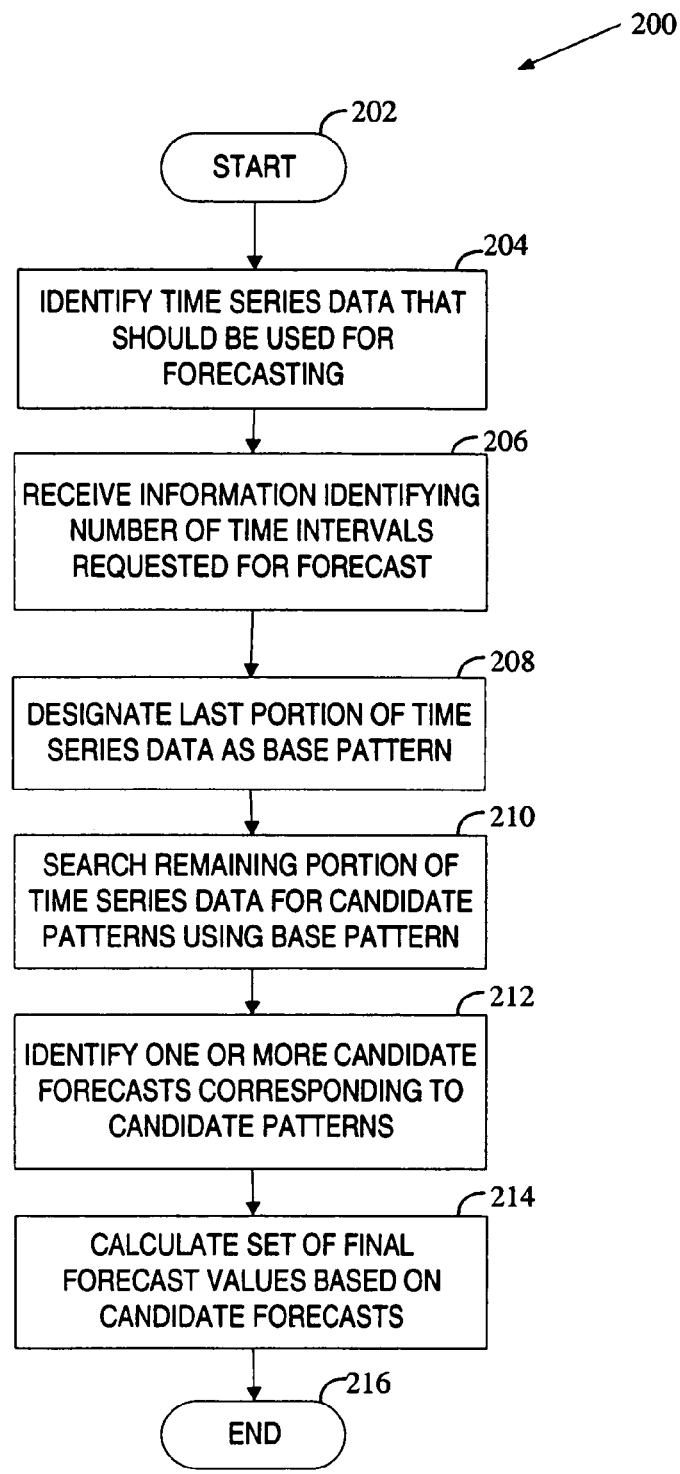
FIG. 2 is a flow diagram of one embodiment of a forecasting process.

FIG. 2 is a flow diagram of one embodiment of a forecasting process. The process may be performed by processing logic that may comprise hardware (e.g., circuitry, dedicated logic, etc.), software (such as run on a general purpose computer system or a dedicated machine), or a combination of both.

Referring to FIG. 2, process 200 begins with processing logic identifying existing time series data that should be used for forecasting (processing block 204). The time series data may be identified upon receiving a user's forecasting request that specifies the location of the time series data. At processing block 206, processing logic receives information identifying the number of time intervals (e.g., three months) for which forecasting is requested. In one embodiment, prior to performing forecasting, processing logic analyzes the existing time series data and modifies it as will be described in greater detail below in conjunction with FIG. 4.

Figure 3:
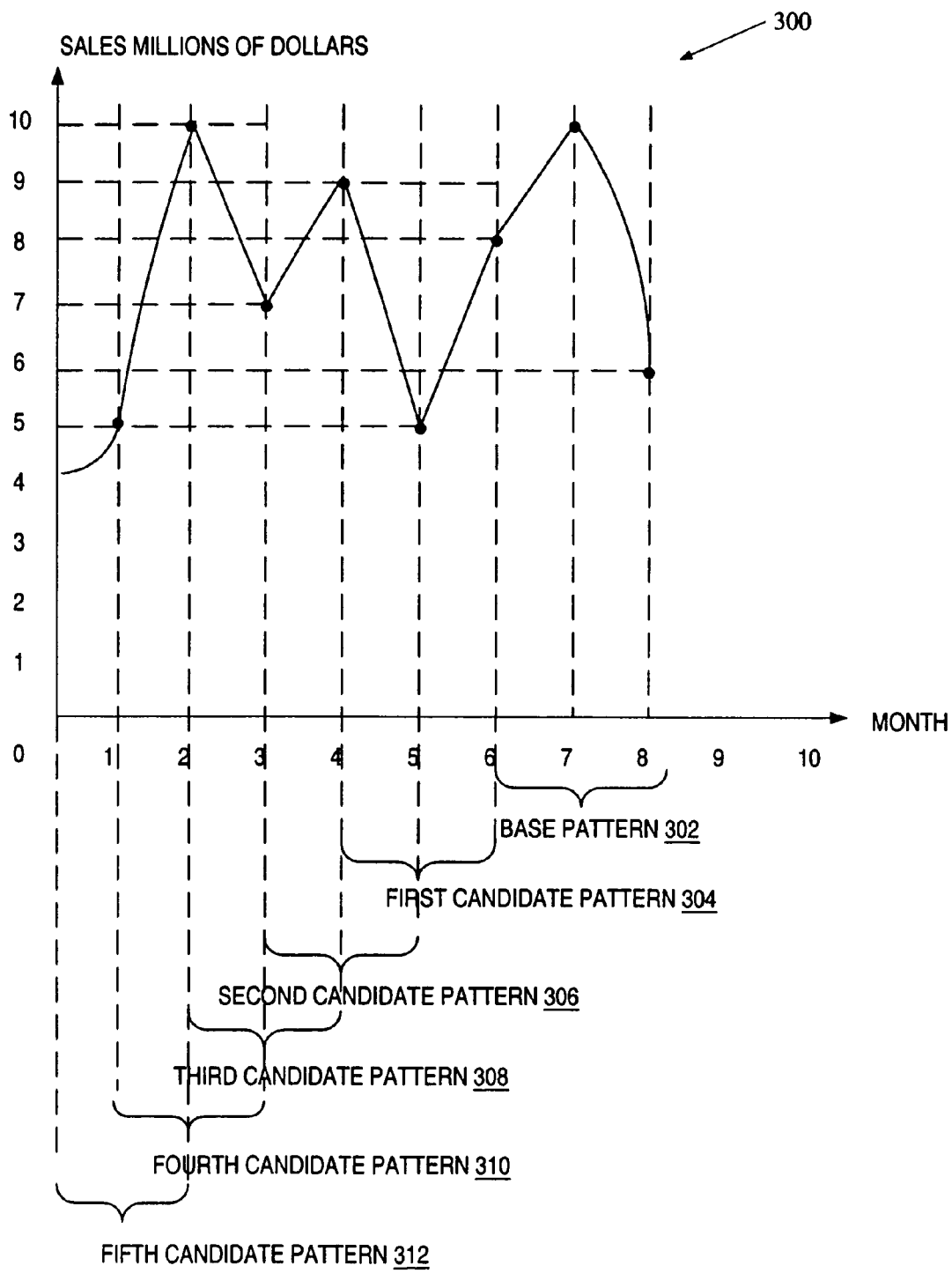
FIG. 3 illustrates candidate patterns within an exemplary time series.

Next, at processing block 208, processing logic designates a last portion of the time series data as a base pattern. In one embodiment, the length of the base pattern is defined by the number of time intervals for which the forecast is requested. Alternatively, the length of the base pattern may exceed the requested number of time intervals and may be either programmatically defined or specified by a user. At processing block 210, processing logic searches the remaining portion of the time series data for candidate patterns using the base pattern. In one embodiment, each pattern of the same length as the base pattern is designated as a candidate pattern. FIG. 3 illustrates candidate patterns within an exemplary time series 300.

Referring to FIG. 3, time series 300 represents monthly sales of a company over the last eight months. The request for forecasting requires predicting future sales for the next two months (months 9 and 10) using the time series data 300. As shown in FIG. 3, the last two months (months 7 and 8) of time series data 300 are designated as a base pattern 302. A pattern covering months 5 and 6 that immediately precedes the base pattern 302 is designated as a first candidate pattern 304. A pattern beginning one time interval prior to candidate pattern 304 and extending over the next two months (months 4 and 5) is designated as a second candidate pattern 306. Similarly, patterns 308, 310 and 312 are also designated as candidate patterns.

Returning to FIG. 2, in one embodiment, once the candidate patterns are identified, each candidate pattern is assigned a weight based on the similarity between this candidate pattern and the base pattern. In one embodiment, the weight is based on the distance between the candidate pattern and the base pattern. The distance depends only on the similarity of the patterns and not on their median heights, as will be explained in more detail below. In other embodiments, various other techniques known in the art can be used to evaluate the similarity between the candidate pattern and the base pattern and to calculate the weight of the candidate.

In one embodiment, only the candidate pattern with the highest weight is selected for future processing. In another embodiment, only the candidate patterns with the weight higher than a threshold value are selected for future processing. In yet another embodiment, all candidate patterns participate in future processing, regardless of their weight.

Further, at processing block 212, processing logic identifies candidate forecasts corresponding to the candidate patterns. In one embodiment, only a candidate forecast corresponding to the selected candidate pattern is identified. Alternatively, candidate forecasts that correspond to all candidate patterns are identified. A candidate forecast is a portion of the time series data that immediately follows a corresponding candidate pattern and extends for the number of intervals requested for forecasting. Referring again to FIG. 3, a first candidate forecast follows first candidate pattern 304 and includes time series values for months 7 and 8, a second candidate forecast follows second candidate pattern 306 and includes time series values for months 6 and 7, a third candidate forecast follows third candidate pattern 308 and includes time series values for months 5 and 6, etc.

Referring back to FIG. 2, at processing block 214, processing logic calculates a set of final forecast values using the candidate forecasts. In one embodiment, a candidate forecast that corresponds to the candidate pattern with the highest weight is used as a final forecast. Alternatively, each candidate forecast is associated with a weight assigned to a corresponding candidate pattern and the set of final forecast values is determined by calculating a weighted average of the candidate forecasts.

In one embodiment, once the forecast is constructed, upper and lower confidence bands are estimated to demonstrate the accuracy of the constructed forecast. The confidence bands are estimated by calculating forecast values for the past times series data having more recent data that can be compared with the calculated forecast values. Referring to FIG. 3, in one embodiment, a pattern including months 5 and 6 is designated as a base pattern. Using the forecasting process described above, forecast values are then determined for months 7 and 8 that follow the designated base pattern. The forecast values are compared with the actual values of months 7 and 8, and the forecast error is computed. This technique is repeated for each portion of time series data 300 that can be designated as a base pattern and has preceding data that can be used as one or more candidate patterns. The resulting errors are then combined and the confidence bands are calculated using the resulting errors, as will be described in more detail below.

Analysis and Modification of Time Series Prior to Forecasting

One component of weekly or monthly time series data is a seasonal component, often referred to as seasonality. The seasonal component reflects variation in a time series that is dependent on the time of year. It describes any regular fluctuations with a period of less than one year. For example, the costs of various types of fruits and vegetables, unemployment figures and average daily rainfall, all show marked seasonal variation.

While some time series such as stock prices, price of gold, etc. have no significant seasonal effects, various other time series have a noticeable seasonal effect. For example, the quarterly sales of a business may have a generally upward trend, but superimposed on yearly trend may be a quarterly seasonal effect. For instance, sales may be typically higher in the fourth quarter, lowest in the first and intermediate in the second and third quarters. This quarterly pattern is called a seasonal effect with a period of 4. Hourly electrical demand is lowest from midnight to sunrise and rises after sunrise. This hourly pattern is a seasonal effect with period 24. If the data is aggregated into the total daily demand, a weekly effect may exist with the heaviest demand on weekends. This is a seasonal effect at period of 7.

In one embodiment, if the time series has a seasonal component, then the seasonal component is isolated and estimated. For instance, if the series consists of quarterly sales figures and systematically vary by quarter, the analysis may determine that the first quarter sales are 20 percent below the yearly average, the second quarter sales are 10 percent below the yearly average, the third quarter sales are 10 percent above the yearly average, and the fourth quarter sales are 20 percent above the yearly average. In one embodiment, once the seasonal effect is estimated, it is removed from the time series to simplify the forecasting process and increase the accuracy of the resulting forecast. One embodiment of the estimation of the seasonal effect and its removal from the time series data is described in greater detail below.

Time series data can also have missing values and anomalous values called outliers. Values may be missing for a variety of reasons, such as, for example, the failure of a measuring device or a computer disk, the loss of a report, etc. Outliers may be caused by errors in entering data, reporting data, recording data, etc. or by unusual events occurred in the period of recording, e.g., a sharp and transitory increase or drop in a stock price. In one embodiment, prior to utilizing the existing time series data in forecasting, the existing time series data is analyzed to identify missing values and outliers. The missing values are then filled in and the outliers are replaced by more reasonable values, as will be described in more detail below.

The time series data also includes a noise component which is caused by random effects from period to period or from one measurement to the next measurement. For example, the number of hits on a web site between 1:00 p.m. and 2:00 p.m. on a Tuesday will not be the same as the number of hits in the same hour on the following Tuesday or on the Tuesday before.

In one embodiment, the time series data is analyzed prior to forecasting to estimate the noise component and remove it from the time series, as will be described in more detail below.

Once the noise and seasonal effects are separated from the time series data, the remaining component of the time series becomes a trend component. Trend is a long-term movement in a time series. The trend reflects the underlying direction (an upward or downward tendency) and rate of change in a time series.

Figure 4:
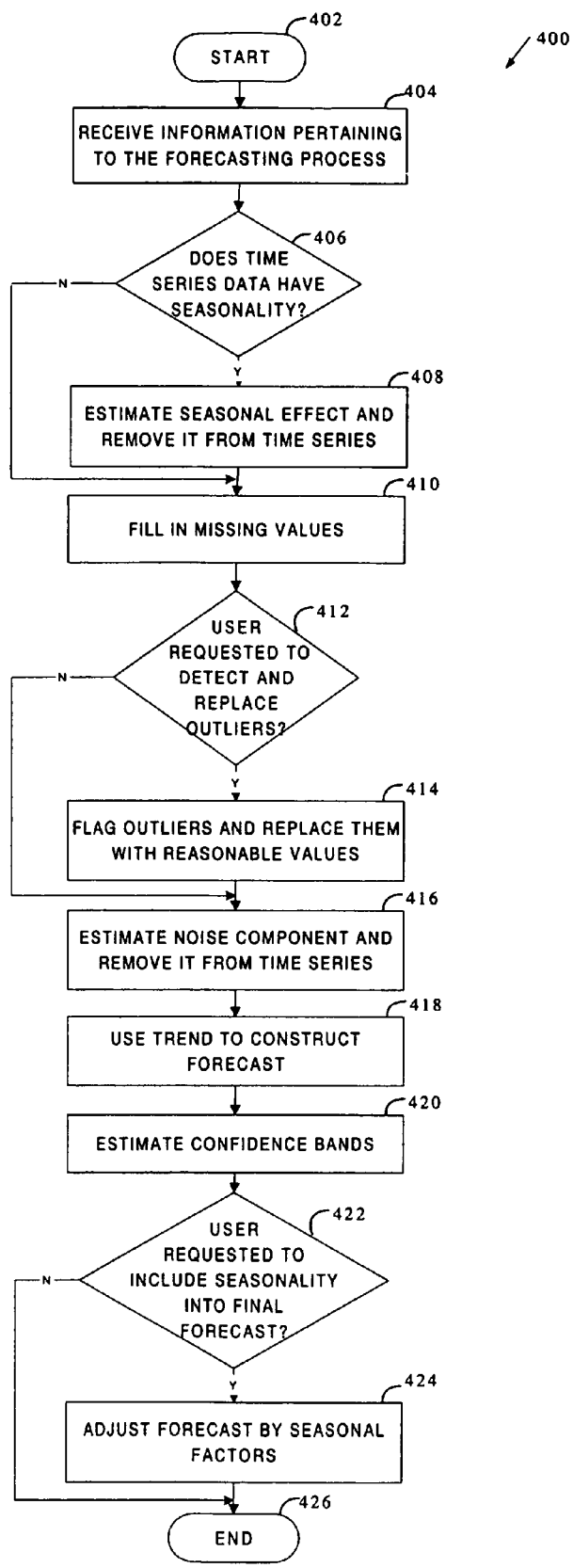
FIG. 4 is a flow diagram of one embodiment of a process for performing a forecasting program.

FIG. 4 is a flow diagram of one embodiment of a process for performing a forecasting program. The process may be performed by processing logic that may comprise hardware (e.g., circuitry, dedicated logic, etc.), software (such as run on a general purpose computer system or a dedicated machine), or a combination of both.

Figure 5A:
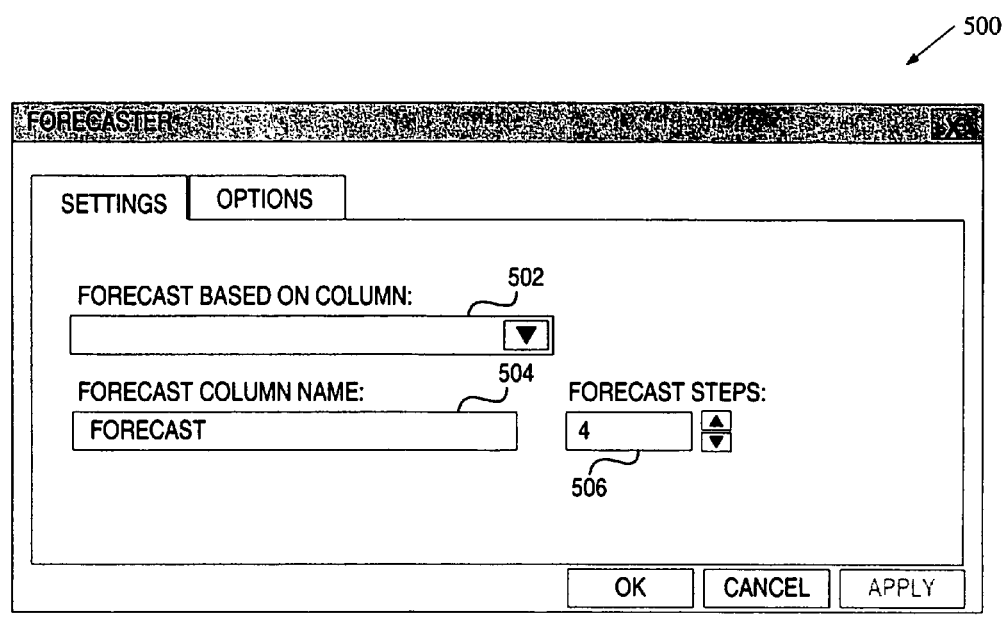
FIGS. 5A and 5B illustrate exemplary user interfaces that facilitate a user's input of information pertaining to forecasting.
Figure 5B:
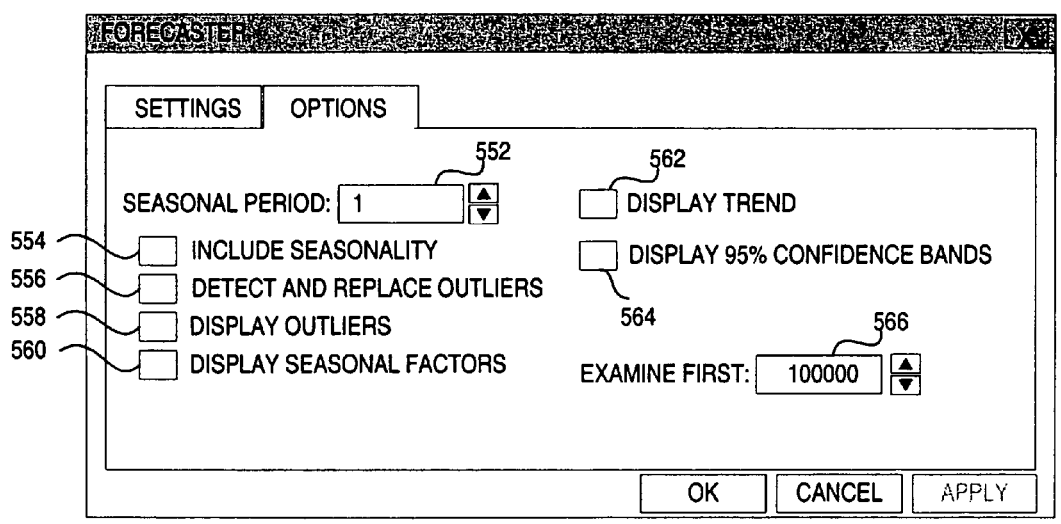

Referring to FIG. 4, process 400 begins with processing logic receiving information pertaining to the forecasting process (processing block 404). This information may specify the location of the existing time series data that should be used by the forecasting program and the number of time intervals for which forecasting is requested. In addition, the information may include an indicator of seasonality, a request to detect and replace outliers, etc. FIGS. 5A and 5B illustrate exemplary user interfaces that facilitate the user's input of the information pertaining to the forecasting.

Referring to FIG. 5A, user interface 550 includes a field 502 that allows the user to select the time series for the forecast. A field 504 may be used to specify the column name that will be assigned to the forecast values. A field 506 may be used to indicate the number of time intervals requested for the forecast by the user. In one embodiment, the number of time intervals is dependent on the number of data values in the time series. In one embodiment, if the ratio between these two numbers exceeds a certain threshold, the number entered by the user in field 506 is adjusted to the maximum number allowed.

Referring to FIG. 5B, user interface 550 includes various options provided to the user by the forecasting program. A seasonal period field 552 allows the user to indicate whether the time series data has seasonality and facilitates the user's input of a seasonal period. In one embodiment, a zero indicates that the time series data is not seasonal. Any other value represents a seasonal period. For example, if the data is quarterly, a 4 would be entered. If the data is monthly, a 12 would be entered. If the data is weekly, a 7 would be entered.

A check box 554 allows the user to request to include seasonality in the resulting forecast values. That is, the forecast values will be adjusted by the seasonal factors to mimic any seasonality found in the time series data. A check box 556 allows the user to request the forecasting program to detect outliers and replace them with more reasonable values.

The user may request the forecasting program to display the outliers by checking a check box 558. In one embodiment, in response to this request, a new column will be created with 0s for rows that were not detected as outliers and 1s for rows that were detected as outliers.

A check box 560 allows the user to request a display of seasonal factors. In one embodiment, the seasonal factors computed by the forecast program are added as a column. In one embodiment, there is one factor for each period. For example, for quarterly data, four quarterly factors are computed and displayed to the user.

If a check box 562 is checked, the trend for the original time series data is displayed. If a check box 564 is checked, two columns are created that contain the upper and lower 95-percent confidence band for the forecast. The confidence bands allow the user to judge the accuracy of the final forecast at a 95-percent confidence level.

Returning to FIG. 4, at decision box 406, processing logic determines whether the time series data has seasonality. If the determination is positive, processing logic estimates the seasonal effect and removes it from the time series (processing block 408). Next, processing logic fills in missing values (processing block 410) and determines whether the user requested to detect and replace outliers (decision box 412). If this determination is positive, processing logic flags the outliers and replaces them with more reasonable values (processing block 414).

Next, at processing block 416, processing logic estimates a noise component and removes it from the time series. As a result, the only remaining component of the time series is a trend component. Further, processing logic uses the trend to construct the forecast (processing block 418). At processing block 420, processing logic estimates confidence bands to demonstrate the accuracy of the forecast.

Afterwards, if processing logic determines that the user requested to include seasonality into the final forecast (decision box 422), the forecast values are adjusted by the seasonal factors to include the seasonal effect into the forecast (processing block 424).

Estimating the Seasonal Effect

To simplify the description, assume there are no missing values or outliers. Suppose the time series consists of 100 monthly measurements with a yearly seasonal effect. Number the measurements by $n=1, 2, \ldots 100$ and denote the nth value in the series by $x(n)$. If one knew, apriori, the deseasonalized trend values, $t(n)$, $n=1, 2, \ldots, 100$, then estimating the seasonal components would be relatively easy. Let $p(k)$ be the seasonal factor for the kth month. These factors are such that for n the kthj month in a year, the measured $x(n)$ is approximately the trend $t(n)$ times $p(k)$. If $p(k)=0.8$, then the sales or production for March is on average 20 percent less than the deseasonalized long-term average or trend.

Look at those members of the series that are third month measurements; i.e., $n=3, 15, 27, 39 \ldots, 99$. For each of these values of the measurement $x(n)$ should be $p(k)$ times $t(n)$.

The above relationship is not exact because of the noise. Instead assume that for n any third month $$x(n)=p(3)t(n)(1+\epsilon(n)) \quad (1)$$

That is, $x(n)$ is $p(3)$ $t(n)$ multiplied by the noise factor $(1+\epsilon(n))$. Write equation (1) as $$x(n)/t(n)=p(3)((1+\epsilon(n)) \quad (2)$$

Take the average of (2) over all third months, getting $$av_3[x(n)/t(n)]=p(3)(1+av_3\epsilon(n))$$

There are 9 third months in the 100 measurements in the series. Since noise tends to be as positive as negative, one can assume that $av_3\epsilon(n)$ is small. This gives the estimate $$p(3)=av_3[x(n)/t(n)]$$

For the kth months in the year use the analogous estimate $$p(k)=av_k[x(n)/t(n)] \quad (3)$$

where the average is over all kth months of the year in the series. These estimates are reasonable if the seasonal factors $\{p(k)\}$ are constant or slowly changing through the duration of the series.

The difficulty is that the deseasonalized trend used in equation (3) is not known until the seasonal factors are estimated. What we work with is a first approximation to the deseasonalized trend.

One embodiment of a way of getting this approximation is described below. At third month $n=15$, average the measurements over a 12 month period from six months before month 15 to five months after; i.e., average over $x(9)$, $x(10)$, $x(11)$, ..., $x(20)$. The seasonal factors, by definition, have average one over any 12-month period. If the trend over the period from month 9 to month 20 is approximately constant, then it follows, with some algebra, that this average is approximately equal to $t(15)$. For every third month starting with $n=15$ and ending at $n=87$, the same procedure is used to estimate $t(n)$. Then, the method of estimation given in equation (3) is used.

In another embodiment, in order to avoid discarding data, the average is taken only over the 7 third months beginning with 15 and ending with 87, instead of averaging over the 9 third months in the series starting with 3 and ending with 99.

In yet another embodiment, in which the trend is not assumed to be constant over each averaging period, an alternative procedure may be used that uses all of the data. At month 15 take the data $x(9), \ldots, x(20)$ from six months before 15 to five months after and regress these on a linear trend. That is, find the a,b minimizing $$\Sigma_{k=-6}^{k=5}(x(15+k)-a-bk)^2$$

Then a good approximation to $t(15)$ is a. At the first third month, month 3, regress the values $x(1), \ldots, x(12)$, on a linear trend line minimizing $$\Sigma_{k=-2}^{9}(x(3+k)-a-bk)^2$$

If the trend from months 1 to 12 nearly linear, then a good estimate for $t(3)$ is a again. At month 99, regress on the last 12 months of data and again put estimate $t(99)$ by a. This method lets all 9 third month data be used in the estimation of $p(3)$.

If there is missing data, the missing data are initially replaced by a weighted average of the closest non-missing values on the right and left. After the seasonal factors $\{p(k)\}$ are estimated in the first pass then if the value at nth month (kth month in the year) was initially missing, it is now replaced by $t(n)p(k)$. The average magnitude of the noise level e is estimated as $$e=\text{median}_n |[x(n)/(p(k)t(n)]-1|$$

where $p(k)$ is the monthly seasonal factor corresponding to the nth month, i.e. for months 3, 15, ..., 99 it is $p(4)$. For months 2, 14, ..., 95 it is $p(2)$. If $$|[x(n)/(p(k)t(n)]-1|>4e$$

then $x(n)$ is flagged as an outlier and replaced by $p(k)t(n)$. Then, the process of estimating seasonal factors is repeated using the revised outlier values, and the revised estimates $p(k)t(n)$ for the missing values. For the second iteration the $x(n)$ are replaced by $x(n)/p(k)$ to give a better estimate of $t(n)$. Then the $p(k)$ are recalculated using the second estimate of $t(n)$.

The last step is to replace $x(n)$ is by $x(n)/p(k)$ where $p(k)$ is the factor corresponding to the nth month. This gives the deseasonalized series, which we again, by abuse of notation, call $x(n)$.

Mend—Filling in Missing Values and Detecting and Replacing Outliers

In this part of the analysis, the series is deseasonalized but may still have missing values and outliers present. In particular, if the original series was classified by the user as non-seasonal, then it did not go through the first stage of seasonal adjustment which detected and revised some of the more obvious outliers.

In a Mend procedure, a small integer number, nreg, is chosen. If x(n) is missing, the nreg closest non missing values above n and the nreg closest non missing values below n are taken. For instance suppose nreg=2 and the measurement for n=17 is missing. Suppose that the two closest non-missing values above 17 are x(19 and x(21), and below 17 are x(15) and x(16). A weighted linear regression is done on these four values with weights inversely proportional to their distance to 17. That is, a and b are chosen to minimize $$0.5(x(15)-a-15b)^2+(x(16)-a-16b)^2+0.5(x(17a)-a-17b)^2+0.25(x(21)-a-21b)^2$$

For the minimizing a, b, set the replaced missing value to x(17)=a+17 b. If there are no nreg non-missing values below a missing value, fill in above. For instance, if x(2) is missing, but x(1) is non missing, use the closest three non missing values above n=2 in the regression.

Actually, this procedure may be done for all x(n), missing or not.

For non-missing values use the closest non-missing nreg values above and closest below with weighting. This regression gives an estimated value of t(n). A new estimation e' of the magnitude of error is $$e'=\text{median}_n|[x(n)/t(n)]-1|$$

where the median is taken over the non missing data. If, for a non missing value x(n), $$|[x(n)/t(n)]-1|>4e'$$

then x(n) is flagged as an outlier and replaced by t(n).

At the end of this procedure, all missing values have been filled in and outliers detected and replaced by more reasonable values.

Estimating the Trend Curve

The input to this procedure is the deseasonalized series with missing values filled in and outliers replaced. It still contains the noise component. Locally, the deseasonalized series equals trend plus noise, i.e., $$x(n)=t(n)+\epsilon(n)$$

The problem is how to remove the noise. Since noise is random up and down, the only way to remove it is by some sort of averaging.

Suppose that at time n, the series is averaged from j=n−k to j=n+k. Then $$av_{n-k,n+k}[x(j)]=av_{n-k,n+k}[t(j)]+av_{n-k,n+k}[\epsilon(j)]$$

The average of $_\epsilon(j)$ over 2k+1 values is usually close to zero. Therefore, an approximation to t(n) is given by $$av_{n-k,n+k}[x(j)]$$

Suppose t(j) is linear from n−k to n+k. Then t(n) is close to $$av_{n-k,n+k}[x(j)]$$

since the average of a straight line is the point in the center of the line. If t(n) is not linear over this range, then averaging results in an estimation error. If k is large enough to average out the noise, then t(n) may not be linear from n−k to n+k. If k is small enough so that t(n) is nearly linear from n−k to n+k, then it may not be large enough to get small noise averages. Thus, there is some optimal value of k that balances these two types of estimation errors.

Straight averaging from −k to k may not be always advantageous as it may not work at the two ends of the series, it may weigh the values at both ends of the interval n−k to n+k the same as the center values closer to n, and it may not have a way of determining the optimal k. The procedure described herein addresses these possible problems.

Weighted Linear Regression with Deletion

If n is at least k intervals away from the two ends of the series, do a weighted linear regression on the values x(h−k), m . . . , x(n−1), z(n+1), . . . , x(n+k) minimizing $$\sum_{j=-k, j\neq 0}^{k} w(j)(x(n+j)-a-bj)^2 \qquad (4)$$

over a and b, where w(j) weights the values x(k+j) and x(k−j) in the regression by $$w(j)=[1-(|j|/(k+1)]$$

The values closer to x(n) are weighted more heavily. This is known as a triangular weighting. It is important to note that the central value x(n) is left out of the regression. Estimate t(n) as a+bn. where a and b are minimizing values in the regression.

If t(n) is linear in the range n−k to n+k, then the estimate has no error due to curvature of t(n). If it is curved in the interval, the estimates will be closer to the true value of the trend than a straight averaging since the values closer to n are more heavily weighted.

Suppose that n is so close to the start of the series that there are no k values of the series to the left of n. Then, the regression in equation (4) cannot be applied. Instead, the regression is done using the nl=n−1 values to the left of n and the nr=2k−(n−1) values to the right of n. The values to the left at n=j, j+1, . . . , nl are weighted by w(j)=1−|j|/(nl+1). The values above, n=j, n+1, . . . , nr are weighted by w(j)=1−|j|/(nr+1). The analogous procedure is followed when there are less than k values of the series to the right of n.

Finding the Optimal k (Window Size)

Finally there is the problem of finding the optimal k (window size). Recall that the value x(n) was never used in determining the estimate t(n). Therefore, the value |t(n)−x(n)| is an estimate of both the noise value at n and the curvature error. For a fixed window size k, let $$e(k) = \sum_n |x(n)-t(n)|$$

Compute e(k) for various values of k, and select the optimal k as that one giving the minimum value of e (k). The values of k searched over are the integers closest to 0.025N, 0.050N, . . . , 0.25N, where N is the length of the series.

Constructing the Forecast and Confidence Bands

To forecast the trend exactly n ahead intervals into the future, take L to equal n ahead or 4, whichever is larger. The base pattern consists of the values t(N−L+1), t(N−L+2), ..., t(N), where t(N) is the last value of the estimated trend curve. Denote this vector of L values by V(N), and let the vector V(n) be the L-long stretch of values t(n−L+1), ..., t(n).

A distance D(N,n) between V(N) and V(n) is defined by first computing the median v of the L numbers $$d_l = t(N-l+1) - t(n-l+1), l=1, \ldots, L$$

Then let $$D(N,n) = \sum_{l=1}^{L} |t(N-l+1) - t(n-l+1) - v|$$

What this does is it moves all of the L values t(N−l+1), l=1, ..., L equally up or down until they have the same median as the L values t(n−l+1), l=1, ..., L and then computes the absolute difference between their values. This makes the distance between V(N) and V(n) depends only on the similarity of their patterns and not their median heights.

To construct the forecast for, say, four intervals ahead, look for all V(n) such that N−n>4. For each such V(n), there is available four intervals of data following n. Call the four values following n a candidate forecast and denote them as:

$$F(n) = [t(n+1), t(n+2), t(n+3), t(n+4)]$$

Over all v(n), n≤N−4, compute the minimum of D(N,n). Let n* be the value at which the minimum occurs. Then V(n*) is the pattern most closely matching V(N). For any other n, let r(n)=D(N,n)/D(N,n*). Thus, r(n) is a measure of how much worse a fit V(n) is to V(N) than V(n*). Define the probability pr(n) of the forecast candidate F(n) following V(n) as $$pr(n) = \exp(-3r(n)) \Big/ \sum_k \exp(-3r(k)) \qquad (5)$$

The further away V(n) is from V(N), the smaller its probability.

Many other functions of V(n) could be used to define probabilities pr(n). The support for equation (5) is heuristic. Other, more straightforward methods, such as putting pr(n) =1/5 for the 5 V(n) closest to V(N), did not work as well in tests on some time series.

The forecast for the four intervals ahead is given by $$t_f(N+4) = t(N) + \sum_n pr(n)[t(n+4) - t(n)]$$

To forecast each of the 12 intervals ahead, the forecasts for 1, 2, 3, ... 12 are computed as above. This is done separately, instead of computing one 12-month forecast, because for example, to forecast one interval ahead more use can be made for the data near the end of the series; i.e., V(n) up to N−4 can be used. To forecast ahead 12 intervals, only V(n) up to N−12 can be used.

Constructing Confidence Bands

The construction of confidence bands is done by backcasting. For instance, to form the confidence interval for forecasting one interval ahead, ignore t(N) and let V(N−1) be the base patterns of 4 values. Using the V(n), n≤N−2, to match the base pattern V(N−1), construct a forecast $t_f(N)$ for t(N). Compute the absolute value of the error $$e(N) = |t(N) - t_f(N)|$$

Repeat, taking V(N−2) as the base pattern and using the V(n) for n≤N−3, construct the forecast for t(N−1). Let $$e(N-1) = |t(N-1) - t_f(N-1)|$$

Continuing as far as possible to V(5) as a base period gives errors e(N), e(N−1), ..., e(5). Each of these is weighted by how accurately the base pattern beginning at N−k is matched by a previous candidate base pattern. The average absolute error of the one-interval forecast is estimated as the weighted average of the e(k).

$$\bar{e}(1) = av_n(e(n))$$

and the upper and lower band values for the one-interval forecast are $$t_f(N+1) \pm 2.5\bar{e}(1)$$

corresponding to a 95% confidence interval.

This back casting procedure is repeated up to n ahead forecast intervals giving the band $$t_f(N+k) \pm 2.5\bar{e}(k), k=1, \ldots, \text{nahead}$$

The band errors increase roughly linearly with k. To cut down on the noise, a linear regression is done, minimizing $$\sum_{k=1}^{nahead} (\bar{e}(k) - a - bk)^2$$

The final band is $$t_f(N+k) \pm 2.5(a+bk), k=1, \ldots, \text{nahead}$$

To get the seasonal forecasts and band, multiply by the seasonal factors. For instance, if N+k is a third month, then the seasonal prediction and band is $$p(3)[t_f(N+k) \pm 2.5(a+bk)]$$

An Exemplary Computer System

FIG. 6 is a block diagram of an exemplary computer system 600 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 600 includes a processor 602, a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 620 (e.g., a speaker) and a network interface device 622.

The disk drive unit 616 includes a computer-readable medium 624 on which is stored a set of instructions (i.e., software) 626 embodying any one, or all, of the methodologies described above. The software 626 is also shown to reside, completely or at least partially, within the main memory 604 and/or within the processor 602. The software 626 may further be transmitted or received via the network interface device 622. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A computer program product comprising a computer useable medium having computer program logic recorded thereon for enabling a processor in a computer system to perform forecasting, said computer program logic comprising: means for enabling the processor to designate a portion of time series data as a base pattern; means for enabling the processor to identify one or more candidate patterns from a remaining portion of the time series data based on a comparison with the base pattern; means for enabling the processor to identify one or more candidate patterns from a remaining portion of the time series data based on a comparison with the base pattern; means for enabling the processor to construct a forecast based on one or more candidate forecasts, wherein each of the one or more candidate forecasts is associated with a corresponding candidate pattern; and means for storing the forecast in memory for further processing or display.

2. The computer program product of claim 1, further comprising:
   means for enabling the processor to receive a number of time intervals for which a forecast is requested.

3. The computer program product of claim 2, wherein the means for enabling the processor to designate a portion of time series data as a base pattern comprises:
   means for enabling the processor to designate a portion of time series data having a length that is the same as the number of time intervals for which the forecast is requested as a base pattern.

4. The computer program product of claim 1, further comprising:
   means for enabling the processor to designate a pattern following each of the one or more candidate patterns as a candidate forecast.

5. The computer program product of claim 1, further comprising:
   means for enabling the processor to assign a weight to each of the one or more candidate patterns.

6. The computer program product of claim 5, further comprising:
   means for enabling the processor to select the one or more candidate forecasts based on the weight assigned to each candidate pattern associated with the one or more candidate forecasts.

7. The computer program product of claim 1, further comprising:
   means for enabling the processor to remove a seasonal effect from the time series data.

8. The computer program product of claim 1, further comprising:
   means for enabling the processor to remove noise from the time series data.

9. A computerized forecasting method comprising designating a portion of time series data as a base pattern; identifying one or more candidate patterns from a remaining portion of the time series data based on a comparison with the base pattern; constructing a forecast based on one or more candidate forecasts, wherein each of the one or more candidate forecasts is associated with a corresponding candidate pattern; and storing the forcast in memory for further processing or display.

10. The method of claim 9, further comprising:
    receiving a number of time intervals for which a forecast is requested.

11. The method of claim 10, wherein designating a portion of time series data as a base pattern comprises:
    designating a portion of time series data having a length that is the same as the number of time intervals for which the forecast is requested as a base pattern.

12. The method of claim 9, further comprising:
    designating a pattern following each of the one or more candidate patterns as a candidate forecast.

13. The method of claim 9, further comprising:
    assigning a weight to each of the one or more candidate patterns.

14. The method of claim 13, further comprising: selecting the one or more candidate forecasts based on the weight assigned to each candidate pattern associated with the one or more candidate forecasts.

15. The method of claim 9, further comprising:
    removing a seasonal effect from the time series data.

16. The method of claim 9, further comprising:
    removing noise from the time series data.

* * * * *